3,627,549
BARIUM SILICATE GLASS FOR TELEVISION
DISPLAY CATHODE-RAY TUBES
Coenraad Maria La Grouw, Emmasingel, Eindhoven,
Netherlands, assignor to U.S. Philips Corporation, New
York, N.Y.
No Drawing. Filed Sept. 10, 1969, Ser. No. 856,804
Claims priority, application Netherlands, Sept. 14, 1968,
6813195
Int. Cl. C03c 3/04
U.S. Cl. 106—52                                2 Claims

ABSTRACT OF THE DISCLOSURE

Glass for envelopes of cathode-ray tubes for television display, particularly screen glass or colour television, which transmits at most 0.5 mr./h. of X-ray radiation at an acceleration voltage of 35 kv., and which has the following composition in percent by weight:

| | |
|---|---|
| $SiO_2$ | 54–61 |
| $Na_2O$ | 6–10 } Combined 13–17. |
| $K_2O$ | 4–10 |
| $Al_2O_3$ | 3–7 |
| $MgO$ | 0–1.5 } Combined 1–3.5. |
| $CaO$ | 0.5–2.5 |
| $BaO$ | 17–21 |
| $CeO_2$ | 0.05–0.3 |
| $As_2O_3+Sb_2O_3$ | 0.3–0.7 |

---

The invention relates to glass for an envelope of a cathode-ray tube for television display, particularly glass for the window of the tube.

Special requirements are imposed on glass for envelopes of cathode-ray tubes for the display of coloured television pictures in comparison with glass for display of monochrome television pictures. Such a special glass is known from the Dutch patent application 6609666 of which the composition in percent by weight lies within the following range of compositions:

| | |
|---|---|
| $SiO_2$ | 62–66 |
| $Li_2O$ | 0–1 |
| $Na_2O$ | 7–8.5 |
| $K_2O$ | 6.5–9 |
| $CaO$ | 2–4.5 |
| $BaO$ | 11–14 |
| $MgO$ | 0–3 |
| $PbO$ | 0–2 |
| $Al_2O_3$ | 1–4 |
| $As_2O_3+Sb_2O_3$ | 0.3–0.7 |
| $CeO_2$ | 0.05–0.3 |

The special requirements which in comparison with glass of the envelopes for monochrome display are imposed on glass for envelopes for colour display relate to differences in the manufacture and in the use of these tubes. In the first place the glass components of envelopes for colour display cannot be sealed, as in the case of the envelopes for monochrome display, but must be connected together with the aid of an enamel. This resides in the fact that a shadow mask is provided in these tubes which determines the path of the three required electron beams. Furthermore an extremely fine, raster-like pattern of three different luminescent substances corresponding to the apertures of the shadow mask is provided on the inner side of the screen. The requirements relative to the maximum admissible distortion of the glass are for this reason much stricter in this case than for glass of envelopes for monochrome display. In addition the temperature to which the tube must be heated during evacuation must be twenty degrees higher and the heat treatment must be of a longer duration than for the tubes for monochrome display.

From a technological viewpoint and with respect to the softening point, the quality and the thermal coefficient of expansion of these glasses within the above-mentioned range are eminently satisfactory. With the acceleration voltages used until recently for the electron gun, the absorption of these glasses for the X-ray radiation generated during operation as a result of the eelctron bombardment on the glass and on the shadow mask is sufficiently great. This even applies when the tube is encased in a cabinet in a direct-vision construction, thus without a protective cover glass.

Up till now there has been the requirement that the intensity of transmitted X-ray radiation is at most 0.5 millirontgen per hour (mr./h.) for a maximum thickness of the screen glass of 11 mm., an acceleration voltage of 27.5 kv. and an anode current of 300 $\mu$a. in a television display tube.

There is, however, a tendency to still further increase the safety margin relative to X-ray radiation emitter by television display tubes. A kind of glass is currently needed, in which at most 0.5 mr./h. is emitted at an acceleration voltage of 35 kv. The above described glasses then no longer have a sufficiently high absorption and do not satisfy the stricter safety requirements. For reasons of a technological nature the thickness of the screen cannot be increased much more than 11 mm. To obtain a sufficiently high absorption while using a glass within the above-mentioned range of compositions the screen should at least be 2.5 mm. thicker.

For satisfactory processing of the glass and pressing windows thereof it is necessary that the temperature dependence of the viscosity not be too great. In practice this means that the temperature difference between the softening point which is the temperature at which the viscosity of the glass is $10^{7.6}$ poises and the annealing point which is the temperature at which the viscosity of the glass is $10^{13.4}$ poises must be at least 190° C.

In connection with the conventional manufacturing technique and the very strict requirements which are imposed upon the maximum admissible distortion of the glass components during manufacture of the tube, it is necessary that glass for a colour television tube have an annealing point which is not lower than 485° C.

Finally it is important that glass for a colour television display tube has approximately the same coefficient of expansion as the known glasses (approximately $100 \times 10^{-7}$ between 30 and 300° C.) so that a better compatibility is obtained with the existing glasses and metal components which must be sealed on and sealed in respectively.

An object of the invention is to obtain glasses for envelopes of television display tubes, particularly colour television display tubes, which satisfy all the mentioned requirements including the requirement of a maximum transmitted X-ray radiation of 0.5 mr./h. of a display tube equipped with such an envelope and having a screen of approximately 11 mms., an acceleration voltage of 35 kv. and an anode current of 300 $\mu$a.

U.S. patent spec. 2,527,693 describes glass for cathode-ray tubes having a coefficient of expansion between 87 and $93 \times 10^{-7}$ and a softening point below 720° C., a different between the softening point ($\eta = 10^{7.65}$ poises) and the strain point ($\eta = 10^{14.6}$ poises) of more than 215° C. These glasses have a composition between the following limits in percent by weight.

| | | |
|---|---|---|
| $SiO_2$ | 53–75 | |
| $Al_2O_3$ | 3–15 | |
| $K_2O$ | 0.1–13 | Total of alkali oxide between |
| $Na_2O$ | 0.1–17 | 16½[BaO] and 19½[BaO]. |
| $Li_2O$ | 0.5–2 | |
| $BaO$ | 3–28 | |
| $F$ | 0.5–2.5 | |

There are a few compositions within this range of which the above-mentioned amount of transmitted X-ray radiation at an acceleration voltage of 35 kv. remains below 0.5 mr./h., namely those having a high BaO content of 17% and more. However, this glass is unsuitable for a colour display tube, because the coefficient of expansion is approximately $10 \times 10^{-7}$ which is too low. In addition, the presence of fluorine which generally decreases the softening point of glasses is considered to be less desirable. In fact, it rather strongly attacks the tools which are used during pressing.

An essential drawback is, however, that this known glass shows impeditive devitrification phenomena so that it is all-together unsuitable for melting in big tanks and automatic manufacture of the pressed parts of envelopes for television display. Glasses having a high BaO content generally have such a tendency of devitrification.

According to the invention a particularly satisfactory compromise was reached by which no difficulty at all due to the tendency of devitrification was experienced.

The glasses according to the invention are characterized in that their composition lies within the following range limited as follows in percent by weight:

| | | |
|---|---|---|
| $SiO_2$ | 54–61 | |
| $Na_2O$ | 6–10 | $Na_2O + K_2O$ combined 13–17. |
| $K_2O$ | 5–10 | |
| $Al_2O_3$ | 3–7 | |
| MgO | 0–1.5 | MgO + CaO combined 1–3.5. |
| CaO | 0.5–2.5 | |
| BaO | 17–21 | |
| $CaO_2$ | 0.05–0.3 | |
| $As_2O_3 + Sb_2O_3$ | 0.5–0.7 | |

The invention will now be described with reference to examples of three glasses according to the invention and their important physical values. These glasses were obtained in a manner which is conventional in the glass technology by melting a mixture of sand, felspar, sodium carbonate, dolomite, barium carbonate and cerium oxide and, if necessary, potassium carbonate, magnesium carbonate and/or calcium carbonate. Arsenous oxide and antimony trioxide were added as refining agents.

The strain point is the temperature at which the viscosity is $10^{14.6}$ poises, the annealing point is the temperature.

| | 1 | 2 | 3 |
|---|---|---|---|
| Composition in percent by weight: | | | |
| $SiO_2$ | 54.5 | 60.7 | 59.8 |
| $Na_2O$ | 6.2 | 9.2 | 9.2 |
| $K_2O$ | 9.6 | 5.4 | 4.9 |
| $Al_2O_3$ | 6.4 | 3.4 | 4.9 |
| MgO | 1.1 | 1.1 | 0.5 |
| CaO | 1.8 | 1.8 | 0.9 |
| BaO | 19.6 | 17.8 | 19.0 |
| $CeO_3$ | 0.2 | 0.2 | 0.2 |
| $As_2O_3 + Sb_2O_3$ | 0.6 | 0.6 | 0.6 |
| Strain point (° C.) | 489 | 464 | 463 |
| Annealing point (° C.) | 516 | 491 | 489 |
| Softening point (° C.) | 711 | 684 | 684 |
| Coefficient of expansion (30–300° C.) $\times 10^{-7}$ | 100 | 101 | 100 | at which the viscosity is $10^{13.4}$ poises and the softening point is the temperature at which the viscosity is $10^{7.6}$ poises.

What is claimed is:

1. Glass for the window of a cathode ray tube for the display of color television which transmits at most 0.5 mr./h. of X-ray radiation at an acceleration voltage of 35 kv. without increase in thickness as compared with known glass compositions, a temperature coefficient of expansion of approximately $100 \times 10^{-7}$, an annealing point not lower than 485° C. and temperature difference between the annealing point and the softening point of at least 190° C., said glass consisting of a composition in percent by weight within the range limited as follows:

| | | |
|---|---|---|
| $SiO_2$ | 54–61 | |
| $Na_2O$ | 6–10 | $Na_2O + K_2O$ combined 13–17. |
| $K_2O$ | 4–10 | |
| $Al_2O_3$ | 3–7 | |
| MgO | 0–1.5 | MgO + CaO combined 1–3.5. |
| CaO | 0.5–2.5 | |
| BaO | 17–21 | |
| $CeO_3$ | 0.05–0.3 | |
| $As_2O_3 + Sb_2O_3$ | 0.3–0.7 | |

2. Glass as claimed in claim 1, characterized in that it has the following composition in percent by weight:

| | |
|---|---|
| $SiO_2$ | 54.5 |
| $Na_2O$ | 6.2 |
| $K_2O$ | 9.6 |
| $Al_2O_3$ | 6.4 |
| MgO | 1.1 |
| CaO | 1.8 |
| BaO | 19.6 |
| $CeO_2$ | 0.2 |
| $As_2O_3 + Sb_2O_3$ | 0.6 |

References Cited
UNITED STATES PATENTS

| | | | |
|---|---|---|---|
| 2,477,329 | 7/1949 | De Gier et al. | 106—52 X |
| 2,527,693 | 10/1950 | Armistead. | |
| 3,222,206 | 12/1965 | Cornelissen et al. | 106—52 |
| 3,374,381 | 3/1968 | Albinak et al. | 106—52 UX |
| 3,464,932 | 9/1969 | Connelly et al. | 106—52 X |

TOBIAS E. LEVOW, Primary Examiner

W. R. SATTERFIELD, Assistant Examiner

U.S. Cl. X.R.

252—478; 313—221